United States Patent
Keung et al.

(10) Patent No.: US 8,202,941 B2
(45) Date of Patent: Jun. 19, 2012

(54) HIGH SHRINKAGE PROPYLENE-BASED FILMS

(75) Inventors: Jay K. Keung, Humble, TX (US); Peijun Jiang, League City, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/992,204

(22) PCT Filed: May 27, 2009

(86) PCT No.: PCT/US2009/045252
§ 371 (c)(1),
(2), (4) Date: Nov. 11, 2010

(87) PCT Pub. No.: WO2009/158100
PCT Pub. Date: Dec. 30, 2009

(65) Prior Publication Data
US 2011/0065867 A1    Mar. 17, 2011

Related U.S. Application Data

(60) Provisional application No. 61/076,467, filed on Jun. 27, 2008.

(51) Int. Cl.
  C08F 2/08    (2006.01)
  C08F 8/00    (2006.01)
  C08L 23/04   (2006.01)
  C08L 23/10   (2006.01)
  C08L 25/02   (2006.01)
  C08K 5/01    (2006.01)

(52) U.S. Cl. ......... 525/191; 525/240; 525/241; 524/848

(58) Field of Classification Search .................. 525/191, 525/240, 241; 524/848
See application file for complete search history.

(56) References Cited

U.S. PATENT DOCUMENTS

| | | | |
|---|---|---|---|
| 4,540,753 A | 9/1985 | Cozewith et al. | |
| 4,916,180 A | 4/1990 | Robinson et al. | |
| 5,079,273 A | 1/1992 | Kuroda et al. | |
| 5,108,820 A | 4/1992 | Kaneko et al. | |
| 5,162,445 A | 11/1992 | Powers et al. | |
| 5,336,552 A | 8/1994 | Strack et al. | |
| 5,382,400 A | 1/1995 | Pike et al. | |
| 5,667,902 A | 9/1997 | Brew et al. | |
| 6,342,565 B1 | 1/2002 | Cheng et al. | |
| 6,444,302 B1 | 9/2002 | Srinivas et al. | |
| 6,525,157 B2 | 2/2003 | Cozewith et al. | |
| 6,559,262 B1 | 5/2003 | Waymouth et al. | |
| 6,647,719 B2 | 11/2003 | Truninger | |
| 6,770,713 B2 | 8/2004 | Hanke et al. | |
| 6,881,800 B2 | 4/2005 | Friedersdorf | |
| 6,984,696 B2 | 1/2006 | Curry et al. | |
| 7,037,461 B1 * | 5/2006 | Denker et al. | 264/519 |
| 7,288,316 B2 | 10/2007 | Jester | |
| 7,390,866 B2 * | 6/2008 | Datta et al. | 526/339 |
| 2004/0236042 A1 | 11/2004 | Datta et al. | |
| 2005/0215964 A1 | 9/2005 | Autran et al. | |
| 2006/0159943 A1 | 7/2006 | Brant et al. | |
| 2006/0178483 A1 | 8/2006 | Mehta et al. | |
| 2009/0105418 A1 | 4/2009 | Dharmarajan et al. | |

FOREIGN PATENT DOCUMENTS

| | | |
|---|---|---|
| EP | 1 017 729 | 7/2000 |
| EP | 1 070 087 | 1/2001 |
| EP | 1 388 559 | 2/2004 |
| EP | 1 614 699 | 1/2006 |
| JP | 01-113059 | 5/1989 |
| JP | 2000-159946 | 6/2000 |
| JP | 2001-301102 | 10/2001 |
| JP | 2002-212359 | 7/2002 |
| JP | 2003-055791 | 2/2003 |
| JP | 2003-192804 | 7/2003 |
| JP | 2004-284197 | 10/2004 |
| JP | 2007-231192 | 9/2007 |
| WO | 02/36651 | 5/2002 |
| WO | 03/040095 | 5/2003 |
| WO | 03/040201 | 5/2003 |
| WO | 03/040202 | 5/2003 |
| WO | 03/040233 | 5/2003 |
| WO | 03/040442 | 5/2003 |
| WO | 2005/049672 | 6/2005 |

OTHER PUBLICATIONS

G. Ver Strate et al., "Near Monodisperse Ethylene-Propylene Copolymers by Direct Ziegler-Natta Polymerization. Preparation, Characterization, Properties", Macromolecules, 1988, vol. 21, pp. 3360-3371.

L.M. Wheeler et al., "Gel Permeation Chromatography/Fourier Transform Infrared Interface for Polymer Analysis", Applied Spectroscopy, 1993, vol. 47, No. 8, pp. 1128-1130.

A.C. Ouano et al., "Gel Permeation Chromatography", Polymer Molecular Weights Part II, Marcel Dekker, Inc., NY, P.E. Slade ed., 1975, pp. 287-368.

F. Rodriguez, "The Molecular Weight of Polymers", Principles of Polymer Systems $3^{rd}$ ed., Hemisphere Pub. Corp., NY, 1989, pp. 155-160.

* cited by examiner

Primary Examiner — Nathan M Nutter

(57) ABSTRACT

A heat-shrinkable film. The film comprising at least one layer having at least one propylene-based polymer comprising 60 wt % to 98 wt % propylene derived units and 2 wt % to 40 wt % one or more other alpha olefins, the propylene-based polymer having: a triad tacticity of 70% or more, a heat of fusion of less than 80 J/g, a weight average molecular weight (Mw) as measured by GPC of from 70,000 to 250,000. The layer also comprises at least one thermoplastic resin and at least one hydrocarbon resin.

16 Claims, No Drawings

HIGH SHRINKAGE PROPYLENE-BASED FILMS

CROSS-REFERENCE TO RELATED APPLICATIONS

This application is a National Stage Application of International Application No. PCT/US09/45252 filed May 27, 2009, which claims priority from U.S. Ser. No. 61/076,467 filed Jun. 27, 2008, both of which are incorporated herein by reference.

FIELD OF THE INVENTION

The present invention generally relates to shrink films. More particularly, embodiments of the present invention relate to shrink films made from propylene-based polymers.

SUMMARY OF THE INVENTION

A heat shrinkable film is provided. In at least one specific embodiment, the film has at least one layer that includes at least one propylene-based polymer having 60 wt % to 98 wt % propylene derived units and 2 wt % to 40 wt % one or more other alpha olefins. The propylene-based polymer can have a triad tacticity of 70% or more, a heat of fusion of less than 80 J/g, a weight average molecular weight (Mw) as measured by GPC of from 70,000 to 250,000. The layer also comprises at least one thermoplastic resin and at least one hydrocarbon resin.

DETAILED DESCRIPTION

Typical high shrink films are made from polyvinylchloride (PVC), polyethylene teraphthalate glycol (PETG) or co-polyesters, and oriented polystyrene (OPS). All of these provide over 50% TD (transverse direction) shrinkage and are solvent-sealable, ideal qualities for use as sleeve labels. Although they provide very good shrink properties, all of these films have some deficiencies. Recyclability is a major issue, especially with the growth of PET bottles. PVC and PETG have densities similar to PET, and therefore cannot be separated from the bottle material during the recycle process. PVC will contaminate the PET, and also suffers from a negative environmental perception. The density of OPS is different enough from PET for separation, but since its density is slightly greater than 1.0 g/cm$^3$, it won't float in a standard water separation recycle stream. Storage stability, or lack thereof, is another area for improvement of currently available shrink sleeve films. Due to the low shrink onset temperatures of these materials, the moderately high temperatures seen during transport and storage will result in some shrinkage and therefore poor roll quality. These films must be kept refrigerated during transport and storage and have a recommended usable life of less than 6 months. Additionally, film cost is high, especially for PETG/co-polyester films.

Oriented polypropylene (OPP) films can be used in shrink labels, although they are best suited for lower shrink (i.e. <25% shrink) applications. These are typically MD (machine direction) shrink films for roll-fed label applications, using a hot melt adhesive for the seam. Current OPP shrink films are limited by the overall amount of shrink, high temperatures needed for shrinking, and hot melt seaming technology. Otherwise, OPP films do have benefits in cost, recyclability, and storage temperature stability.

There have been some disclosures of OPP-containing shrink films. Bioriented films produced using a tenter process for polyethylene based films is described in U.S. Pat. No. 2,241,030. Shrink films comprising a blend of a polypropylene with ethylene-based polymers are disclosed in U.S. Pat. No. 6,908,687. An oriented film comprising metallocene-produced polypropylene is disclosed in U.S. Pat. No. 6,242,084, wherein at least one layer is "voided" to increase the oxygen and water vapor transmission. Voiding may be useful for food wrap films, but not necessarily for shrink wrap films for labels. A polypropylene containing core layer is described in shrink films disclosed in U.S. Pat. No. 6,025,079, but the outer ("skin") layers are not solvent sealable. A metallocene produced propylene copolymer for use in a heat-sealable skin layer of a film is disclosed in U.S. Pat. No. 7,351,478. Each of the above-referenced patents are herein incorporated by reference in its entirety. None of these disclosures fully solves the problem of providing a solvent-sealable, recyclable oriented film for shrink sleeve labels.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

This invention proposes use of propylene-based polymers for making heat-shrinkable films. Surprisingly, these polymers were found to provide heat-shrinkable films, and articles made therefrom, having: high impact strength, especially at elevated temperatures; high free shrink; high modulus; high gloss and package presentation; and excellent optical clarity.

Propylene-Based Polymer

The propylene-based polymer can be one or more propylene-α-olefin-copolymers, propylene-α-olefin-diene terpolymers and propylene-diene copolymers. For simplicity and ease of description, however, the terms "propylene-based polymer" and "propylene copolymer" and "PCP" as used herein will be used interchangeably to refer to propylene-α-olefin-copolymers, propylene-α-olefin-diene terpolymers and propylene-diene copolymers.

In one embodiment, the propylene-based polymer can be prepared by polymerizing propylene with one or more α-olefins. The one or more α-olefins may comprise ethylene, or one or more $C_4$-$C_{20}$ α-olefin or a combination of ethylene and one or more $C_4$-$C_{20}$ α-olefin. In a preferred embodiment the one or more α-olefins comprises ethylene.

In another embodiment, the propylene-based polymer can be prepared by polymerizing propylene with ethylene and/or one or more $C_4$-$C_{20}$ α-olefin, or a combination of ethylene and one or more $C_4$-$C_{20}$ α-olefin and one or more dienes. The one or more dienes can be conjugated or non-conjugated. Preferably, the one or more dienes are non-conjugated.

In another embodiment, the propylene-based polymer can be prepared by polymerizing propylene with one or more dienes. In yet another embodiment, the propylene-based polymer can be prepared by polymerizing propylene with ethylene and/or at least one $C_4$-$C_{20}$ α-olefin, or a combination of ethylene and at least one $C_4$-$C_{20}$ α-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include but are not limited to 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is ENB.

Preferred methods and catalysts for producing the propylene-based polymers are found in publications US 2004/0236042 and WO 05/049672 and in U.S. Pat. No. 6,881,800, which are all incorporated by reference herein. Pyridine amine complexes, such as those described in WO 03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP1070087. The catalyst described in EP1614699 could also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. Other preferred ranges are from about 70 wt % to about 95 wt % propylene, more preferably from about 75 wt % to about 95 wt % propylene, more preferably from about 80 wt % to about 95 wt % propylene, and more preferably from about 80 wt % to about 90 wt % propylene based on the weight of the polymer. In one embodiment, the balance comprises one or more α-olefins. The one or more α-olefins may comprise ethylene, or one or more $C_4$-$C_{20}$ α-olefin or a combination of ethylene and one or more $C_4$-$C_{20}$ α-olefin. In a preferred embodiment, the one or more α-olefins comprises ethylene.

In another embodiment, the balance comprises one or more dienes and optionally one or more of the α-olefins described previously. In one or more embodiments above or elsewhere herein, the alpha-olefin is ethylene, butene, hexene or octene. In other embodiments, two alpha-olefins are present, preferably ethylene and one of butene, hexene or octene.

In the diene containing embodiments, the propylene-based polymer comprises about 0.2 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.2 wt % to about 10 wt %, more preferably from about 0.2 to about 5 wt %, more preferably from about 0.2 wt % to about 4 wt %, preferably from about 0.2 wt % to about 3.5 wt %, preferably from about 0.2 wt % to about 3.0 wt %, and preferably from about 0.2 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other diene containing embodiments, the propylene-based polymer preferably comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 9, 2 to 9, 1.8 to 5, 2 to 2.5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is incorporated by reference herein for purposes of US practices) and references cited therein, in Macromolecules, 1988, volume 21, p 3360 (Verstrate et al.), which is herein incorporated by reference for purposes of US practice, and references cited therein, and in accordance with the procedures disclosed in U.S. Pat. No. 6,525,157, column 5, lines 1-44, which patent is hereby incorporated by reference in its entirety.

In one or more embodiments above or elsewhere herein, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. $\eta_l = KM_v^\alpha$, K and α were measured values for linear polymers and should be obtained on the same instrument as the one used for the g' index measurement.

In one or more embodiments above or elsewhere herein, the propylene-based polymer can have a density of about 0.85 g/cm³ to about 0.92 g/cm³, more preferably, about 0.87 g/cm³ to 0.90 g/cm³, more preferably about 0.88 g/cm³ to about 0.89 g/cm³ at room temperature as measured per the ASTM D-1505 test method.

In one or more embodiments above or elsewhere herein, the propylene-based polymer can have a melt flow rate (MFR, 2.16 kg weight @ 230° C.), equal to or greater than 0.2 g/10 min as measured according to the ASTM D-1238(A) test method as modified (described below). Preferably, the MFR (2.16 kg @ 230° C.) has a MFR of at least 3.0 g/10 min. In another embodiment, the MFR is from about 0.5 g/10 min to about 200 g/10 min or from about 1 g/10 min to about 100 g/10 min. In an embodiment, the propylene-based polymer has an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min, more preferably 10 g/10 min to about 25 g/10 min, or more preferably 2 g/10 min to about 10 g/10 min.

The propylene-based polymer can have a Mooney viscosity ML (1+4)@125° C., as determined according to ASTM D1646, of less than 100, more preferably less than 75, even more preferably less than 60, most preferably less than 30.

In one or more embodiments above or elsewhere herein, the propylene-based polymer can have a heat of fusion (Hf) determined according to the DSC procedure described later, which is greater than or equal to about 0.5 Joules per gram (J/g), and is ≦about 80 J/g, preferably ≦about 75 J/g, preferably ≦about 70 J/g, more preferably ≦about 60 J/g, more preferably ≦about 50 J/g, more preferably ≦about 35 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf), which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-based polymer can also be expressed in terms of percentage of crystallinity (i.e. % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 189 J/g).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to baseline as described herein) being considered the melting point of the propylene-based polymer.

The propylene-based polymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by $^{13}C$ NMR of 70% or greater, 75% or greater, 80% or greater, 82% or greater, 85% or greater, 90% or greater, 95% or greater, or 99% or greater. Preferred ranges include from about 50% to about 99%, more preferably from about 60% to about 99%, more preferably from about 75% to about 99% and more preferably from about 80% to about 99%; and in other embodiments from about 60% to about 97%. The propylene-based polymer may be isotactic, syndiotactic or atactic as determined from triad tacticity. Triad tacticity can be determined by the methods described in US Patent Application Publication 2004/0236042.

In one or more embodiments, the propylene-based polymer can be blended with other polymeric viscosity index modifiers, such as polybutenes, polymers of styrene with butadiene or isoprene that may optionally be hydrogenated or a combination of butadiene or isoprene, ester based viscosity index modifiers such as esters of styrene/maleic anhydride polymers, esters of styrene/maleic anhydride/acrylate terpolymers, and polymethacrylates. Examples for such viscosity index modifiers for such blends include acrylate- or methacrylate-containing copolymers or copolymers of styrene and an ester of an unsaturated carboxylic acid such as styrene/maleic ester (typically prepared by esterification of a styrene/maleic anhydride copolymer).

In one or more embodiments, the propylene-based polymer can itself be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less. In embodiments where the propylene-based polymer is a blend of discrete random propylene-based polymers, it may further be blended with other polymeric viscosity index modifiers, such as polybutenes, polymers of styrene with butadiene or isoprene or a combination of butadiene or isoprene, ester based viscosity index modifiers such as esters of styrene/maleic anhydride polymers, esters of styrene/maleic anhydride/acrylate terpolymers, and polymethacrylates. Examples for such viscosity index modifiers for such blends include acrylate- or methacrylate-containing copolymers or copolymers of styrene and an ester of an unsaturated carboxylic acid such as styrene/maleic ester (typically prepared by esterification of a styrene/maleic anhydride copolymer).

In one or more embodiments above or elsewhere herein, the propylene-based polymer can include a blend of two propylene-based polymers differing in the olefin content, the diene content, or both.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and US Patent Application Publication 2005/215964, all of which are incorporated by reference. The propylene-based polymer can also include one or more polymers consistent with those described in EP 1 614 699 or EP 1 017 729.

Grafted (Functionalized) Backbone

In one or more embodiments, the propylene-based polymer can be grafted (i.e. "functionalized") using one or more grafting monomers. As used herein, the term "grafting" denotes covalent bonding of the grafting monomer to a polymer chain of the propylene-based polymer.

The grafting monomer can be or include at least one ethylenically unsaturated carboxylic acid or acid derivative, such as an acid anhydride, ester, salt, amide, imide, acrylates or the like. Illustrative monomers include but are not limited to: acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt %, preferably at least about 0.5 wt % and highly preferably about 1.5 wt %.

Styrene and derivatives thereof such as paramethyl styrene, or other higher alkyl substituted styrenes such as t-butyl styrene can be used as a charge transfer agent in presence of the grafting monomer to inhibit chain scissioning. This allows further minimization of the beta scission reaction and the production of a higher molecular weight grafted polymer (MFR=1.5).

Preparing Grafted Propylene-Based Polymers

The grafted propylene-based polymer can be prepared using conventional techniques. For example, the graft polymer can be prepared in solution, in a fluidized bed reactor, or by melt grafting. A preferred grafted polymer can be prepared by melt blending in a shear-imparting reactor, such as an extruder reactor. Single screw but preferably twin screw extruder reactors such as co-rotating intermeshing extruder or counter-rotating non-intermeshing extruders but also co-kneaders such as those sold by Buss are especially preferred.

In one or more embodiments, the grafted polymer can be prepared by melt blending the ungrafted propylene-based polymer with a free radical generating catalyst, such as a peroxide initiator, in the presence of the grafting monomer. The preferred sequence for the grafting reaction includes melting the propylene-based polymer, adding and dispersing the grafting monomer, introducing the peroxide and venting the unreacted monomer and by-products resulting from the peroxide decomposition. Other sequences can include feeding the monomers and the peroxide pre-dissolved in a solvent.

Illustrative peroxide initiator include but are not limited to: diacyl peroxides such as benzoyl peroxide; peroxyesters such as tert-butylperoxy benzoate, tert-butylperoxy acetate, OO-tert-butyl-O-(2-ethylhexyl)monoperoxy carbonate; peroxyketals such as n-butyl-4,4-di-(tert-butyl peroxy) valerate; and dialkyl peroxides such as 1,1-bis(tert-butylperoxy) cyclohexane, 1,1-bis(tert-butylperoxy)-3,3,5-trimethylcyclohexane, 2,2-bis(tert-butylperoxy)butane, dicumylperoxide, tert-butylcumylperoxide, Di-(2-tert-butylperoxy-isopropyl-(2))benzene, di-tert-butylperoxide (DTBP), 2,5-dimethyl-2,5-di(tert-butylperoxy)hexane, 2,5-dimethyl-2,5-di(tert-butylperoxy)hexyne, 3,3,5,7,7-pentamethyl 1,2,4-trioxepane; and the like.

Polyolefinic Thermoplastic Resin

The term "polyolefinic thermoplastic resin" as used herein refers to any material that is not a "rubber" and that is a polymer or polymer blend having a melting point of 70° C. or more and considered by persons skilled in the art as being thermoplastic in nature, e.g., a polymer that softens when exposed to heat and returns to its original condition when cooled to room temperature. The polyolefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin component is unvulcanized or non crosslinked.

In one or more embodiments, the polyolefinic thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or s syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. As noted elsewhere herein, certain polypropylenes have a high MFR (e.g., from a low of 10, or 15, or 20 g/10 min to a high of 25 to 30 g/10 min). Others have a lower MFR, e.g., "fractional" polypropylenes which have an MFR less than 1.0. Those with high MFR can be preferred for ease of processing or compounding.

In one or more embodiments, the polyolefinic thermoplastic resin is or includes isotactic polypropylene. Preferably, the polyolefinic thermoplastic resin contains one or more crystalline propylene homopolymers or copolymers of propylene having a melting temperature greater than 105° C. as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polyolefinic thermoplastic resin and methods for making the same are described in U.S. Pat. No. 6,342,565.

The term "random polypropylene" as used herein broadly means a copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

In one or more embodiments, the random polypropylene has a 1% secant modulus of about 100 kPsi to about 200 kPsi, as measured according to ASTM D790A. In one or more embodiments, the 1% secant modulus can be 140 kPsi to 170 kPsi, as measured according to ASTM D790A. In one or more embodiments, the 1% secant modulus can be 140 kPsi to 160 kPsi, as measured according to ASTM D790A. In one or more embodiments, the 1% secant modulus can range from a low of about 100, 110, or 125 kPsi to a high of about 145, 160, or 175 kPsi, as measured according to ASTM D790A.

In one or more embodiments, the random polypropylene can have a density of about 0.85 to about 0.95 g/cc, as measured by ASTM D792. In one or more embodiments, the random polypropylene can have a density of about 0.89 g/cc to 0.92 g/cc, as measured by ASTM D792. In one or more embodiments, the density can range from a low of about 0.85, 0.87, or 0.89 g/cc to a high of about 0.90, 0.91, 0.92 g/cc, as measured by ASTM D792.

In a further embodiment, the density of the polypropylene may range between 0.86 g/cm$^3$ and 0.96 g/cm$^3$, more preferably between 0.865 g/cm$^3$ and 0.95 g/cm$^3$.

In certain embodiments, the polypropylene described herein is predominately crystalline, thus the polypropylene may have a melting point ($T_m$) greater than 110° C. or 115° C. or 130° C. or 140° C., or 150° C., or 160° C. The term "crystalline," as used herein, characterizes those polymers which possess high degrees of inter- and intra-molecular order. In certain embodiments the polypropylene has a heat of fusion ($H_f$) greater than 60 J/g or 70 J/g or 80 J/g or 90 J/g or 95 J/g or 100 J/g, as determined by DSC analysis. In another embodiment, the polypropylene has a heat of fusion from about 80 J/g to about 120 J/g and from about 90 J/g to about 110 J/g. In another embodiment, the propylene-based thermoplastic polymers may be characterized by an $H_f$ that is equal to or greater than 125 J/g, and in other embodiments greater than 140 J/g as measured by DSC. The heat of fusion is dependent on the composition of the polypropylene; the thermal energy for the highest order of polypropylene is estimated at 189 J/g i.e. 100% crystallinity is equal to a heat of fusion of 189 J/g. A polypropylene homopolymer will have a higher heat of fusion than a copolymer or blend of homopolymer and copolymer.

In certain embodiments, the polypropylene has a heptane insoluble amount of greater than about 95%, greater than about 96%, greater than about 97%, greater than about 98%, and greater than about 99%. Heptane insolubles are measured as follows. About 1.3 grams of grounded polypropylene pellets are placed in a thimble and refluxed in heptane for 1.5 hours. The undissolved PP is dried in a vacuum oven at 100° C. for 40 minutes and weighed. The heptane insoluble measurement is the weight percent of undissolved polypropylene based on the weight of the ground polypropylene pellets.

In other embodiments, the propylene based polymer can also be a heterophasic polypropylene having an isotactic PP phase and a dispersed rubber phase. In these cases, the melting point of the polypropylene will be between 165° C. and 120° C.

The polypropylene may have a melt flow rate of less than about 20, more preferably less than about 15, more preferably less than about 10, more preferably less than about 9, more preferably less than about 8, more preferably less than about 7, more preferably less than about 6, and more preferably less than about 5.

In certain embodiments, the polypropylene(s) are isotactic. Isotacticity of the propylene sequences in the polypropylenes can be achieved by polymerization with the choice of a desirable catalyst composition. The isotacticity of the polypropylenes as measured by $^{13}$C NMR, and expressed as meso diad content is greater than 90% (meso diads [m]>0.90) or 95% or 97% or 98% in certain embodiments, determined as in U.S. Pat. No. 4,950,720 by $^{13}$C NMR. Expressed another way, the isotacticity of the polypropylenes as measured by $^{13}$C NMR, and expressed as pentad content, is greater than 93% or 95% or 97% in certain embodiments.

The polypropylene can vary widely in composition. For example, substantially isotactic polypropylene homopolymer or propylene copolymer containing equal to or less than 10 wt % of other monomer, that is, at least 90 wt % by weight propylene can be used. Further, the polypropylene can be present in the form of a graft or block copolymer, in which the blocks of polypropylene have substantially the same stereoregularity as the propylene-α-olefin copolymer so long as the graft or block copolymer has a sharp melting point above 110° C. or 115° C. or 130° C., characteristic of the stereoregular propylene sequences. The polypropylene may be a combination of homopolypropylene, and/or random, and/or block copolymers as described herein. When the polypropylene is a random copolymer, the percentage of the α-olefin derived units in the copolymer is, in general, up to 5% by weight of the polypropylene, 0.5% to 5% by weight in another embodiment, and 1% to 4% by weight in yet another embodiment. The preferred comonomer derived from ethylene or α-olefins containing 4 to 12 carbon atoms. One, two or more comonomers can be copolymerized with propylene. Exemplary α-olefins may be selected from the group consisting of ethylene; 1-butene; 1-pentene-2-methyl-1-pentene-3-methyl-1-butene; 1-hexene-3-methyl-1-pentene-4-methyl-1-pentene-3,3-dimethyl-1-butene; 1-heptene; 1-hexene; 1-methyl-1-hexene; dimethyl-1-pentene; trimethyl-1-butene; ethyl-1-pentene; 1-octene; methyl-1-pentene; dimethyl-1-hexene; trimethyl-1-pentene; ethyl-1-hexene; 1-methylethyl-1-pentene; 1-diethyl-1-butene; propyl-1-pentene; 1-decene; methyl-1-nonene; 1-nonene; dimethyl-1-octene; trimethyl-1-heptene; ethyl-1-octene; methylethyl-1-butene; diethyl-1-hexene; 1-dodecene and 1-hexadodecene.

The weight average molecular weight (Mw) of the polypropylene can be between 50,000 to 3,000,000 g/mol, from 90,000 to 500,000 g/mol in another embodiment or from 200,000 g/mol to 400,000 g/mol in another embodiment. The polypropylene can have a molecular weight distribution (MWD, Mw/Mn) within the range from 1.5 to 2.5 or 3.0 or 4.0 or 5.0 or 20.0 in certain embodiments. In one embodiment, the polypropylene has a MWD of greater than about 4.0. The polypropylene can have an MFR (2.16 kg/230° C.) within the range from 10 or 15 or 18 to 30 or 35 or 40 or 50 dg/min in certain embodiments. In another embodiment, the MFR is from 1 to 10 dg/min or from 1 to 5 dg/min or from 2 to 4 dg/min.

There is no particular limitation on the method for preparing the polypropylenes described herein. However, for example, the polymer is a propylene homopolymer obtained by homopolymerization of propylene in a single stage or multiple stage reactor. Copolymers may be obtained by copolymerizing propylene and ethylene or an α-olefin having from 4 to 20 carbon atoms in a single stage or multiple stage reactor. Polymerization methods include, but are not limited to, high pressure, slurry, gas, bulk, or solution phase, or a combination thereof, using any suitable catalyst such as traditional Ziegler-Natta catalyst or a single-site, metallocene catalyst system, or combinations thereof including bimetallic (i.e., Ziegler-Natta and metallocene) supported catalyst systems.

Exemplary commercial polypropylenes include the family of Achieve™ polymers (ExxonMobil Chemical Company, Baytown, Tex.). The Achieve polymers are produced based on metallocene catalyst system. In certain embodiments, the metallocene catalyst system produces a narrow molecular weight distribution polymer. The MWD is typically in the range of 1.5 to 2.5. However, a broader MWD polymer may be produced in a process with multiple reactors. Different MW polymers can be produced in each reactor to broaden the MWD. Achieve polymer such as Achieve 3854, a homopolymer having an MFR of 24 dg/min can be used as a blend component described herein. Alternatively, an Achieve polymer such as Achieve 6936G1, a 1500 dg/min MFR homopolymer, can be used as a blend component described herein. Other polypropylene random copolymer and impact copolymer may also be used. The choice of polypropylene MFR can be used as means of adjusting the final MFR of the blend, especially the facing layer composition. Any of the polypropylenes described herein can be modified by controlled rheology to improve spinning performance as is known in the art.

Although the "polypropylene" component of the fiber and fabric compositions is sometimes discussed as a single polymer, also contemplated by the term are blends of two or more different polypropylenes having the properties within the ranges described herein. In certain embodiments, the polypropylene may be present in the fabric layer (or fabric layer composition) within the range from 75 or 70 to 80 or 90 or 95 or 99 or 99.9 wt %, by weight of the fabric layer/composition.

In another embodiment, the propylene-based polymer backbone has a DSC melting point of about 120° C. or less, preferably about 115° C. or less, more preferably about 105° C. or less, more preferably about 100° C. or less, more preferably 90° C. or less, more preferably about 85° C. or less, and most preferably about 75° C. or less, and a heat of fusion of about 75 J/g or less, preferably about 70 J/g or less, more preferably about 65 J/g or less, and most preferably about 60 J/g or less. The propylene-based polymer backbone is preferably a propylene-ethylene copolymer, preferably with a propylene content of at least about 75 wt % and ethylene content in the range of about 4 wt % to about 25 wt %, more preferably about 5 to about 24 wt %, more preferably about 7 to about 20 wt %, more preferably about 7 to about 16 wt %, and most preferably about 8 to about 15 wt %.

Hydrocarbon Resin

Hydrocarbon resins ("HCRs") can serve to enhance or modify the flexural modulus, improve processability, or improve the barrier properties of the film. The hydrocarbon resin is preferably a low molecular weight hydrocarbon. Optionally, the resin can be hydrogenated. The resin can have a number average molecular weight less than 5000, preferably less than 2000, most preferably in the range of from 500 to 1000. In one embodiment the number average molecular weight may be from 200 to 5,000. The resin can be natural or synthetic and can have a softening point in the range of from 60 to 180° C.

Hydrocarbon resins are generally derived from petroleum streams, and may be hydrogenated or non-hydrogenated resins. Useful hydrocarbon resins include, but are not limited to, aliphatic hydrocarbon resins, aromatic modified aliphatic hydrocarbon resins, aliphatic/aromatic resins, polycyclic resins, hydrogenated polycyclic resins, hydrogenated polycyclic aromatic resins, hydrogenated aromatic resins in which a substantial portion of the benzene rings are converted to cyclohexane rings, gum rosins, gum rosin esters, wood rosins, wood rosin esters, tall oil rosins, tall oil rosin esters, polyterpenes, aromatic modified polyterpenes, terpene phenolics, and combinations thereof.

In one or more embodiments, the hydrocarbon resin contains one or more petroleum resins, terpene resins, styrene resins, and/or cyclopentadiene resins. In one or more embodiments, the hydrocarbon resin can be selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof. Preferred aliphatic olefins are $C_4$ to $C_{20}$, preferably $C_4$ to $C_7$, even more preferably $C_5$ to $C_6$, linear, branched, or alicyclic olefins or non-conjugated diolefins. Preferred aromatic olefins include one or more of styrene, indene, derivatives of styrene and derivatives of indene. Particularly preferred aromatic olefins include styrene, alpha-methylstyrene, beta-methylstyrene, indene and methylindenes, and vinyl toluenes. In preferred embodiments, the HCR comprises monomers derived from piperylene, isoprene, amylene, cyclics, styrene, indene, or combinations thereof.

Piperylenes are generally a distillate cut or synthetic mixture of $C_5$ diolefins, which include, but are not limited to, cis-1,3-pentadiene, trans-1,3-pentadiene, and mixed 1,3-pentadiene. In general, piperylenes do not include branched $C_5$ diolefins such as isoprene.

Cyclics are generally a distillate cut or synthetic mixture of $C_5$ and $C_6$ cyclic olefins, diolefins, and dimers therefrom. Cyclics include, but are not limited to, cyclopentene, cyclopentadiene ("CPD"), dicyclopentadiene ("DCPD"), cyclohexene, 1,3-cyclohexadiene, and 1,4-cyclohexadiene. The term dicyclopentadiene is defined to include both the endo and exo forms of DCPD. A preferred cyclic is cyclopentadiene. The cyclic may be substituted; preferred substituted cyclics include CPDs and DCPDs substituted with a C1 to C40 linear, branched, or cyclic alkyl group, preferably one or more methyl groups. Methylcyclopentadiene is a preferred substituted cyclopentadiene.

The hydrocarbon resin may include one or more styrenic components, such as styrene, derivatives of styrene, and substituted styrenes. In general, styrenic components do not include fused-rings, such as indene. The hydrocarbon resin may include one or more indenic components, such as indene and derivatives of indene. In some embodiments, the styrenic component may have a lowering effect on the HCR's softening point. Other aromatics (especially indenics) may tend to increase the HCR's softening point. In other embodiments, the hydrocarbon resin may include CPD and DCPD which have a broadening effect on molecular weight distribution and tend to increase the HCR's softening point.

The hydrocarbon resin may be produced by methods generally known in the art for the production of hydrocarbon resins. See for example, the Kirk-Orthmer Encyclopedia of Chemical Technology, $4^{th}$ Ed., Vol. 13, pp. 717-744. For example, in some embodiments, the hydrocarbon resin is produced by thermal polymerization, while in other embodiments the hydrocarbon resin may be produced by catalytic polymerization. The polymerization and stripping conditions may be adjusted according to the nature of the feed to obtain the desired resin.

In one embodiment, the hydrocarbon resin may be prepared by thermal polymerization. For example, the resin may be thermally polymerized prepared from a feed containing cyclopentadiene in a benzene or toluene solvent for 2.0 to 4.0 hours at 220° C. to 280° C. and about 14 bars pressure, with conditions being adjusted to control the molecular weight and softening point of the resin. The feed may further contain alkyl cyclopentadienes, dimers and codimers of cyclopentadiene and methylcyclopentadiene, and other acyclic dienes such as 1,3-piperylene and isoprene. Other copolymerizable unsaturated monomers such as vinyl aromatics including styrene, α-methylstyrene, indene, and vinyl toluene may also be present.

In another embodiment, the hydrocarbon resin may be catalytically polymerized. A preferred method for production of the resins is combining the feed stream in a polymerization reactor with a Friedel-Crafts or Lewis Acid catalyst at a temperature between 0° C. and 200° C., preferably between 20° C. and 80° C. Friedel-Crafts polymerization is generally accomplished by use of known catalysts in a polymerization solvent, and removal of solvent and catalyst by washing and distillation. The polymerization process may be in a batchwise or continuous mode, continuous polymerization may be in a single stage or in multiple stages. The Friedel-Crafts catalysts to be used are generally Lewis Acids such as boron trifluoride (BF3), complexes of boron trifluoride, aluminum trichloride (AlCl3), or alkyl-aluminum halides, particularly chloride. The amount of Lewis Acid to be used in the catalyst is in the range of from 0.3 to 3.0 wt %, based upon the weight of the feed blend, preferably 0.5 to 1.0 wt %. The aluminum trichloride catalyst is preferably used as a powder.

In a preferred embodiment the resins may be hydrogenated. Any known process for catalytically hydrogenating hydrocarbon resins may be used to hydrogenate the resin. The hydrogenation of hydrocarbon resins may be carried out via molten or solution based processes by either a batchwise or, more commonly, a continuous process. Catalysts employed for the hydrogenation of hydrocarbon resins are typically supported monometallic and bimetallic catalyst systems. The catalysts which may be used may include Group VIII metals such as nickel, palladium, ruthenium, rhodium, cobalt, and platinum, Group VI metals such as tungsten, chromium, and molybdenum, Group VII metals such as rhenium, manganese, and copper, other catalysts may be based on group 9, 10, or 11 elements. These metals may be used singularly or in combination of two or more metals, in the metallic form or in an activated form and may be used directly or carried on a solid support such as alumina or silica-alumina. The support material is typically comprises of such porous inorganic refractory oxides such as silica, magnesia, silica-magnesia, zirconia, silica-zirconia, titanic silica-titania, alumina, silica-aluminum alumino-silicate, etc. Preferably, the supports are essentially free of crystalline molecular sieve materials. Mixtures of the foregoing oxides are also contemplated, especially when prepared as homogeneously as possible. Preferred supports include alumina, silica, carbon, MgO, TiO2, ZrO2, FeO3, or mixtures thereof.

In one embodiment, the hydrocarbon resin has a ring and ball softening point of 10° C. to 140° C., 85° C. to 140° C., 100° C. to 140° C., or 80° C. to 120° C. In another embodiment, the hydrocarbon resin has a weight average molecular weight (Mw) of 4000 or less, preferably between 500 and 4000, preferably from 500 to 2500. In another embodiment, the hydrocarbon resin has a Mw/Mn of 3 or less, preferably between 1 and 2.4, or more preferably between 1 and 2.

In another embodiment, the HCR can include 50-90 wt % piperylene, 0-5 wt % isoprene, 10-30 wt % amylene, 0-5 wt % cyclics, 0-10 wt % styrenic components, and 0-10 wt % indenic components. The resin may have a melt viscosity at 160° C. of from 375 cPs to 515 cPs, a Mn of 700-900 g/mole, a Mw of 1400-1800 g/mole, a Mz of 3000-5000 g/mole, and a Tg of 45° C. to 50° C.

In a further embodiment, the hydrocarbon resin can include 60-90 wt % piperylene, 0-5 wt % isoprene, 0-10 wt % amylene, 5-15 wt % cyclics, 5-20 wt % styrenic components, and 0-5 wt % indenic components. The hydrocarbon resin may have a melt viscosity at 160° C. of from 375 cPs to 615 cPs, a Mn of 520-650 g/mole, a Mw of 1725-1890 g/mole, a Mz of 6000-8200 g/mole, and a Tg of 48° C. to 53° C.

In yet another embodiment, the hydrocarbon resin can include dicyclopentadiene and methyl substituted dicyclopentadiene. The hydrocarbon resin can have a softening point of from about 115 to 130° C., a Tg of about 70° C., a Mn of about 410 g/mole, a Mw of about 630 g/mole, and a Mz of about 1020 g/mole.

Hydrocarbon resins that are suitable for use as described herein include EMPR 120, 104, 111, 106, 112, 115, EMFR 100 and 100A, ECR-373 and ESCOREZ® 2101, 2203, 2520, 5380, 5600, 5618, 5690 (commercially available from ExxonMobil Chemical Company of Baytown, Tex.); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla.); SYLVATAC™ and SYLVALITE™ rosin esters (commercially available from Arizona Chemical Company of Jacksonville, Fla.); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa.); FORAL™, PENTALYN™, and PERMALYN™ rosins and rosin esters (commercially available from Hercules, now Eastman Chemical Company of Kingsport, Tenn.); QUINTONE™ acid modified $C_5$ resins, $C_5/C_9$ resins, and acid modified $C_5/C_9$ resins (commercially available from Nippon Zeon of Japan); and LX™ mixed aromatic/cycloaliphatic resins (commercially available from Neville Chemical Company of Pittsburgh, Pa.); CLEARON™ hydrogenated terpene aromatic resins (commercially available from Yasuhara of Japan); and PICCOLYTE™ (commercially available from Loos & Dilworth, Inc. of Bristol, Pa.). Other suitable hydrocarbon resins can be found in U.S. Pat. No. 5,667,902, incorporated herein by reference. The preceding examples are illustrative only and by no means limiting.

Preferred hydrocarbon resins for use in the films described include saturated alicyclic resins. Such resins, if used, can have a softening point in the range of from 85 to 140° C., or preferably in the range of 100 to 140° C., as measured by the ring and ball technique. Examples of suitable, commercially available saturated alicyclic resins are ARKON-P® (commercially available from Arakawa Forest Chemical Industries, Ltd., of Japan).

Film Construction

The films described can have any number of layers. In at least one exemplary embodiment, the films can have at least 2 layers, at least 3 in another embodiment, and at least 5 layers in another embodiment. The films typically have at least two skin layers that are bound to a tie layer on one face, and are unbound (face away from the film) on the other face. However, the films can include structures in which one or more skin layers are sandwiched between other layers. In one or more embodiments, the skin layer(s) can be bound directly to the core, with no tie-layer in between. Preferably, there is a tie layer between each core layer and each skin layer that are otherwise adjacent to one another in the structure. If each skin layer is labeled "S", and each core layer labeled "C", and each tie layer labeled "T", then preferable film structures include, but are not limited to SCS, STC, STCT, STCTS, SSTCTS, STSCTSTS, SSTCCTSS, STSTCCTSTS, STTCTTS, SSSTCTS, SSTCTS, and other such structures. In the films described, each individual skin layer may be the same or different, preferably the same, in composition compared to other skin layers in the same film. Also, each core layer may be the same or different, and each tie layer may be the same or different. Furthermore, for example, there may be a skin layer in a film that does not meet the description of "comprising a styrenic copolymer or a polyester copolymer," as is also true of multiple tie and core layers. Thus, for example, the film structures above might be represented by $S^1T^1CT^2S^2$, $S^1S^2T^1CT^2S^1$, etc., wherein "$S^1$" and "$S^2$" are distinct from one another, meaning that they comprise different materials, and/or the same materials but in different ratios. The same is true for "$T^1$" and "$T^2$". Preferably, however, each skin layer, tie layer, and core layer that makes up a film will have a similar or identical identity, as this type of structure allows the use of only three extruders to melt blend and extrude the materials that form each layer of the film.

As used herein, the term "layer" refers to each of the one or more materials, the same or different, that are secured to one another in the form of a thin sheet or film by any appropriate means such as by an inherent tendency of the materials to adhere to one another, or by inducing the materials to adhere as by a heating, radiative, chemical, or some other appropriate process. The term "layer" is not limited to detectable, discrete materials contacting one another such that a distinct boundary exists between the materials. Preferably however, the materials used to make one layer of a film will be different (i.e., the weight percent of components, the properties of each component, and/or the identity of the components may differ) from the materials used to make an adjacent, and adhering, layer. The term "layer" includes a finished product having a continuum of materials throughout its thickness. The "films" described herein comprise three or more layers, and can include 3, 4, 5 or more layers in particular embodiments.

The films described have a utility as shrink films for use in labels, and in a particular embodiment, shrink films in which the transverse direction ("TD") of the film heat-shrinks to a greater extent than in the machine direction ("MD") of the films. Also, the films described undergo TD shrinkage of greater than 40% or 50% at desirably low temperatures; at less than 130° C. in one embodiment, and at less than 125° C. in another embodiment, and at less than 120° C. in yet another embodiment, and at less than 110° C. in yet another embodiment. In a particular embodiment, the TD shrinkage is greater than 40% or 50% at a given temperature within the range of from 110 to 115 or 120 or 125° C., while the MD shrinkage is less than 10 or 15% at a given temperature at the same temperature ranges. In another more particular embodiment, the TD shrinkage is greater than 40% or 50% at 121° C., while the MD shrinkage is less than 10% or 15% at the same temperature.

In one or more embodiments, the films described are translucent or transparent, most particularly transparent. In one embodiment, a film as described herein having a thickness of from 40 to 60 µm possesses a Haze value (ASTM D1003) of less than 4 or 5 or 6 or 7 or 8 or 10%. In particular embodiments, the tie and skin layers are chosen such that, when formed with at least one core layer into a film, the overall film Haze value is less than 4 or 5 or 6 or 7 or 8 or 10%.

In one or more embodiments, the films have at least one layer comprising a propylene-based polymer present in an amount from 50 to 95 wt %, 60 to 95 wt %, 70 to 95 wt %, 70 to 90 wt %, 75 to 85 wt %, about 75 wt %, and about 80 wt %;

a polyolefinic thermoplastic resin present in an amount from 5 to 20 wt %, 5 to 15 wt %, 10 to 15 wt %, 12 to 13 wt %, and about 12.5 wt %; and the hydrocarbon resin is present in an amount of from 1 to 20 wt %, 1 to 15 wt %, and 5 to 15 wt %, based on the total weight of the film.

In one or more embodiments, the film has a heat-shrinkage (ASTM D-2732-96) index of more than 10%, more than 15%, from 10 to 20%, from 15 to 20%. The film also has optical clarity of a haze less than 5%, 4%, 3%, 2%, and 1% with a gloss of greater than 80%, 90%, and 95%.

The 3, 4, 5, 6 or more layer film structures (films) may be any desirable thickness, and in one or more embodiments have an average thickness within the range of from 20 or 30 or 40 to an upper limit of 50 or 60 or 80 or 100 or 150 or 200 or 500 µm. Thus, an exemplary average thickness is within the range of from 30 to 80 µm.

Core Layers

The core layer can include one or more propylene-based polymers, one or more hydrocarbon resins, one or more polyolefinic thermoplastic resins, or mixtures thereof. In at least one specific embodiment, the core layer includes the propylene-based polymer in an amount ranging from a low of about 70 wt % to about 75 wt % to a high of about 95 wt % to about 100 wt %. The core can also include up to 1 or 2 or 3 wt %, by weight of the core layer, of additives such as antioxidants, antiblock agents, ultraviolet radiation absorbers, fillers such as talc, silica, alumina and clay, calcium carbonate and treated silica or nano-sized titanium or zirconium, or other additives known in the art; in a particular embodiment. In one or more embodiments, void initiating particles are substantially absent from the core layer, meaning that they are present, if at all, to less than 1 wt % of the core layer, and not present in any detectable amount in another embodiment. Examples of void initiating particles include those made from polybutylene terephthalate, nylon-6, calcium carbonate, cyclic olefin copolymers particles, and other particles that are phase-distinct from the core layer material, and having a size that, during orientation, will create cavities in the core layer.

The core layer may be any desirable thickness, and in one or more embodiments has an average thickness within the range of from 10 or 20 or 30 or 40 to an upper limit of 50 or 60 or 100 or 150 or 200 µm. Thus, an exemplary average overall film thickness is from 30 to 60 µm. In one or more embodiments, the core layer comprises greater than 70 wt % of the total weight of the film (all layers combined), and comprises greater than 80 wt % in another embodiment.

Skin Layers

Each skin layer can independently include one or more propylene-based polymers, one or more hydrocarbon resins, one or more polyolefinic thermoplastic resins, or mixtures thereof. In at least one specific embodiment, each skin layer can independently include copolymers or terpolymers of ethylene, propylene, and butylene. In some preferred embodiments, each skin layer can independently include at least one polymer selected from the group consisting of propylene homopolymer, ethylene-propylene copolymer, butylene homopolymer and copolymer, ethylene-propylene-butylene (EPB) terpolymer, ethylene vinyl acetate (EVA), metallocene-catalyzed propylene homopolymer, and combinations thereof. An example of a suitable EPB terpolymer can be Chisso 7794 (commercially available from Chisso Corporation of Japan).

Heat sealable blends can be utilized in providing the skin layer. Thus, along with the skin layer polymer identified above there can be, for example, other polymers, such as polypropylene homopolymer, e.g., one that can be the same as, or different from, the iPP of the core layer. The skin layer can additionally or alternatively include materials selected from the group consisting of ethylene-propylene random copolymers, LDPE, linear low density polyethylene (LLDPE), medium density polyethylene (MDPE), and combinations thereof.

The thickness of each skin layer can be the same or different, and can range from about 0.10 to 7.0 microns, preferably about 0.10 to 4 microns, and most preferably about 0.10 to 3 microns. In one or more embodiments, the skin layer thickness can be from about 0.10 to 2 microns, 0.10 to 1 microns, or 0.10 to 0.50 microns. Each skin layer can have a thickness ranging from about 0.5 to about 2 microns, about 0.5 to about 3 microns, or about 1 to about 3.5 microns.

In one or more embodiments, each skin layer can independently include one more materials that allow the final film to be solvent sealed, i.e. capable of being dissolved by cyclic or linear ethers, linear or cyclic alkanes or alkenes, at 25° C. Examples include tetrahydrofuran, 1,3-dioxolane, hexane, cyclohexane and benzene, and substituted versions thereof. In one or more embodiments, at least one skin layer comprises a styrenic copolymer or a polyester copolymer. When stating "a styrenic copolymer" and "a polyester copolymer," mixtures of those materials within that class are contemplated along with the possibility of having only one such copolymer. Each skin layer in the film can include the same or different materials, and/or the same or different amounts of materials. In one embodiment, one or more skin layers is adjacent to only one tie layer; in another embodiment one or more skin layers is adjacent to two tie layers, sandwiched there between. When referring to a "styrenic copolymer" or a "polyester copolymer," it is understood that these terms include a blend of two or more "styrenic copolymers" or "polyester copolymers."

The term "styrenic copolymer" refers to copolymers comprising at least 50 wt % styrene-derived units by weight of the styrenic copolymer, and one or more other monomer units, examples of which include butadiene, ethylene, 1-butene, and propylene. In one embodiment, the styrenic copolymer is a block copolymer. The styrenic block copolymers contemplated for use herein are materials having blocks of monoalkenyl arene polymer and blocks of conjugated diene polymer. The polymer blocks have the general configuration: "A-B-A," and are arranged such that there are at least two monoalkenyl arene polymer end blocks "A" and at a least one elastomeric conjugated diene mid block "B". These polymer blocks can optionally be hydrogenated to eliminate the unsaturation in the mid block "B". The monoalkenyl arene blocks comprise from 50 or 60 or 65 to an upper limit of from 80 or 90 wt % of the block copolymer in one embodiment. Thus, an exemplary range of monoalkenyl arene copolymer blocks units is within the range of from 60 to 90 wt %.

The term "monoalkenyl arene" includes compounds of the benzene series such as styrene and its analogues and homologues including o-methyl styrene and p-methyl styrene, p-tert-butyl styrene, 1,3-dimethyl styrene, p-methyl styrene and other ring alkylated styrenes, particularly ring methylated styrenes, and other monoalkenyl polycyclic aromatic compounds such as vinyl naphthalene, vinyl anthrycene and the like. For the film layers described herein, the preferred monoalkenyl arenes are monovinyl, monocyclic arenes such as styrene and p-methyl styrene, styrene being particularly preferred.

In one or more embodiments the amount of monoalkenyl arene does not exceed 95 wt % of the weight of the copolymer, nor comprise an amount less than 50 wt % of the copolymer. Preferred amounts of monoalkenyl arene in the block copolymer are within the range of from 50 or 55 or 60 wt % to an upper limit of from 75 or 80 or 90 or 95 wt %, the remainder made up of the "B" block, or other non-arene monomers. An exemplary range of arene is within the range of from 60 to 90 wt %. The block copolymers are optionally "oil extended" by the addition of a hydrocarbon oil and allows for improved processability. When present, the oils are present in amounts of between 10 to 40 wt % by weight of the styrenic block copolymer.

The block "B" comprises homopolymers of conjugated diene monomers, copolymers of two or more conjugated dienes, and copolymers of one or more of the dienes with a monoalkenyl arene as long as the blocks "B" are predominantly conjugated diene units. The conjugated dienes preferably used herein contain from 4 to 8 carbon atoms. Examples of such suitably conjugated diene monomers include: 1,3-butadiene (butadiene); 2-methyl-1,3-butadiene; isoprene; 2,3-dimethyl-1,3-butadiene; 1,3-pentadiene (piperylene); 1,3-hexadiene; combinations thereof, and the like. Hydrogenation of the unsaturated elastomer (Block B) results in a saturated tri-block copolymer (A-B-A).

In one embodiment the monoalkenyl arene polymer of the styrenic copolymer is polystyrene; and the preferred conjugated diene polymers are polybutadiene and polyisoprene, especially preferred being polybutadiene. A desirable styrenic copolymer for use in the skins described herein is polystyrene-co-polybutadiene copolymer (or "styrene-butadiene copolymer" or "SBS"). Other embodiments of the styrenic copolymer are hydrogenated versions of such styrenic block copolymers. Thus, in one embodiment, the styrenic block copolymer is selected from the group consisting of styrene-ethylene-ethylene-propylene-styrene block copolymers and styrene-ethylene-butylene-styrene block copolymer, styrene-ethylene-propylene-styrene copolymer and mixtures thereof. A commercial embodiment of a desirable styrenic copolymer is K-Resin™ KR01, or any other injection molding K-Resin grade (Chevron Phillips), DK-11 or other film grade (Chevron Phillips) and EA3400 General purpose polystyrene (Chevron Phillips). Film grade styrenic copolymers are most preferred as the major component of the skin layer(s).

In one or more embodiments, the styrenic copolymer used in the skin layer is the same as one or all of the styrenic copolymers of the tie layer, and are different in a particular embodiment. In one embodiment, the styrenic copolymer has a melt mass flow rate within the range of from 1 or 2 to an upper limit of 15 or 20 dg/min (200° C., 5.0 kg, ASTM 1238). In another embodiment, the styrenic copolymer has a Flexural Modulus (0.250 in, ASTM D790) of less than 2000 or 2500 MPa; and in the range of from 800 to 2500 MPa in yet another embodiment.

In another embodiment, the styrenic copolymer of the at least one skin layer comprises a styrenic copolymer having a Flexural Modulus (0.250 in, ASTM D790) of greater than 2500 MPa and a melt mass flow rate within the range of from 0.1 or 0.5 to an upper limit of from 5 or 15 or 20 dg/min (200° C., 5.0 kg). In another embodiment, the Flexural Modulus of this styrenic copolymer is within the range of from 2500 to 4000 MPa.

In another embodiment, the at least one skin layer consists of a blend within the range of from 60 to 95 wt %, by weight of the blend, of a styrenic copolymer possessing a Flexural Modulus (0.250 in, ASTM D790) of less than 2000 or 2500 MPa, and within the range of from 5 to 40 wt % of a styrenic copolymer possessing a Flexural Modulus (0.250 in, ASTM D790) of greater than 2500 or 3000 MPa.

As used herein, "polyester copolymers" refers to polymers which are saturated products coming from the condensation of at least glycols and dicarboxylic acids, or of their derivatives; thus, the term "copolymer" here also includes terpolymers, etc. Preferably, polyester copolymers comprise the products of the condensation of aromatic dicarboxylic acids having from 8 to 14 carbon atoms and of at least one glycol chosen from the group consisting of neopentyl glycol, cyclohexanedimethanol and aliphatic glycols represented by the formula $HO(CH_2)_nOH$ wherein "n" is an integer ranging from 2 to 10. Up to 50 mol % of the aromatic dicarboxylic acid may be replaced with at least one other aromatic dicarboxylic acid having from 8 to 14 carbon atoms, and/or up to 20 mol % may be replaced with an aliphatic dicarboxylic acid having from 2 to 12 carbon atoms.

Non-limiting examples of suitable polyester copolymers are polyethylene terephthalate (PET), polyethylene terephthalate glycol (PETG), poly(1,4-butylene) terephthalate (PBT), 1,4-cyclohexylene dimethylene terephthalate/isophthalate) and other esters derived from aromatic dicarboxylic acids such as isophthalic acid, dibenzoic acid, naphthalene dicarboxylic acid, 4,4'-diphenylenedicarboxylic acid, bis(p-carboxyphenyl)methane acid, ethylene bis(p-benzoic) acid, 1,4-tetramethylene bis(p-oxybenzoic) acid, ethylene bis (para-oxybenzoic) acid, 1,3-trimethylene bis(p-oxybenzoic) acid, and glycols such as ethylene glycol, 1,3-trimethylene glycol, 1,4-tetramethylene glycol, 1,6-hexamethylene glycol, 1,3-propylene glycol, 1,8-octamethylene glycol and 1,10-decamethylene glycol. In a particular embodiment, the polyester copolymer is polyethylene-terephthalate glycol copolymer. In one or more embodiments, the melt flow index ("MFI", 250° C., 2.16 kg, ASTM 1238) of the suitable polyester copolymers are within the range of from 0.1 or 0.5 or 1 to an upper limit of 5 or 12 or 20 or 40 or 60 dg/min. The term "polyester copolymer" includes blends of various polyesters.

In one or more embodiments, the polyester copolymers consist of several diacids and/or several diols. In one or more embodiments, the polyester copolymers include copolyetheresters. These copolyetheresters are copolymers containing polyester blocks and polyether blocks, the polyether units derived In one or more embodiments from polyetherdiols such as polyethylene glycol (PEG), polypropylene glycol (PPG) or polytetramethylene glycol (PTMG), dicarboxylic acid units such as terephthalic acid units and short, chain-extender, diol units such as glycol(ethanediol) or 1,4-butanediol. The linking of the polyethers with the diacids forms flexible segments whereas the linking of the glycol or butanediol with the diacids forms the rigid segments of the copolyetherester. The proportion of these copolyetheresters may represent up to 30 wt % of thermoplastic polyester. A commercial embodiment of a desirable polyester copolymer for use in the skin layer is Eastar™ 6763 (Eastman). Certain polylactic acid polymers would also be suitable as skin materials either alone or in a blend with the other polymers of the skin layer.

In one or more embodiments, at least one skin layer also comprises an antiblock agent. In a particular embodiment, all skin layers comprise an antiblock agent. As used herein, an "antiblock" agent is any compound or mixture of compounds, minerals, treated minerals, etc. that is used in polyolefins to lower the tackiness of a material or blend of materials. Examples of antiblock agents include porous inorganic oxide materials, in one embodiment those from the Periodic Table of Elements of Groups 2, 3, 4, 5, 13 or 14 metal oxides, and most preferably Groups 4, 13 and 14. More particular examples of suitable antiblock agents include silica, alumina, silica-alumina, magnesia, titania, zirconia, and mixtures thereof are particularly desirable. Common talcs and clays can also be used. Commercial examples of suitable antiblock agents include Sibelite™ M4000 (Sibelco), a high purity silica, and other Sibelite silicas, as well as Sipernat™, Sylobloc™ and, Tospearl™ silicas, and Kaopolite™ silica-alumina can also be used as antiblock agents.

The antiblock agent can be added to the skin layers disclosed herein as a neat solid, a slurry in a liquid such as a hydrocarbon- or silicon-based processing oil, or as part of a masterbatch that can include, for example, polyolefinic polymers (low density polyethylene, high density polyethylene, polypropylene) polystyrene, etc, or be part of a thermoplastic vulcanizate as described further below. In the film layers described herein, there can be one or more different antiblock agents, "different" meaning that the antiblock agents each have a different structure and/or some other distinct property, but such that all of the antiblock agent fall within the broadest description of those agents herein. In one embodiment, each skin layer herein comprises from 0.01 or 0.05 or 0.1 wt % to an upper limit of 1 or 2 or 3 wt % of the antiblock agent by weight of the skin layer. Thus, an exemplary amount of antiblock in each skin layer is within the range of from 0.1 to 1 wt %.

In one embodiment, all of the skin layers comprise a polyester copolymer, and in another embodiment, all of the skin layers consist essentially of a polyester copolymer, and optionally an antiblock agent. In yet another embodiment, all of the skin layers comprise a styrenic copolymer, and in another embodiment, all of the skin layers consist essentially of a styrenic copolymer and optionally an antiblock agent.

In one or more embodiments, ethylene-based polymers are substantially absent from the skin layers, or any layer of the films described in a particular embodiment, meaning that these polymers are present in an amount of no more than 1 wt % by weight of the skin layer, and not detectable in another embodiment. "Ethylene-based polymers" are those that comprise 60 wt % or more of ethylene-derived units. Also, In one or more embodiments, propylene-based polymers are substantially absent from the skin layers, meaning that these polymers are present in an amount of no more than 1 wt % by weight of the skin layer, and not detectable in another embodiment. "Propylene-based polymers" are those that comprise 60 wt % or more of propylene-derived units.

In one or more embodiments, silicon fluid is substantially absent from the skin layers, or any layer of the films described in a particular embodiment, meaning that the silicon fluids are present in an amount of no more than 1 wt % by weight of the skin layer, and not detectable in another embodiment. "Silicon fluids" include silicon polymers having a viscosity of greater than 25,000 cps in one embodiment, and greater than 300,000 cps (as measured by a Brookfield viscometer) in another embodiment.

In one or more embodiments, hydrocarbon resins are substantially absent from the skin layers, or any layer of the films described in a particular embodiment, meaning that these resins are present in an amount of no more than 1 wt % by weight of the skin layer, and not detectable in another embodiment. "Hydrocarbon resins" are low molecular weight polymers/oligomers consisting of hydrocarbons, the resin having a softening point of less 90 to 130° C. (according to ASTM 1525; or DIN 1995-U4). Commercial examples of such hydrocarbon resins are DCPD resins (The Dow Chemical Co.), Escorez™ resins (ExxonMobil Chemical Co.) and Pyrolen™ resins (Lukoil).

In one or more embodiments, each skin layer is within the range of from 0.5 or 1 µm to an upper limit of 6 or 10 or 12 or 14 or 20 µm in average thickness. Thus, an exemplary skin thickness is within the range of 1 to 6 µm.

Tie Layers

The tie layer can be any material or blend of materials that is suitable for adhering the skin and core layers together, as well as maintains a film haze as described above. In at least one specific embodiment, at least one tie layer can include one or more propylene-based polymers, one or more hydrocarbon resins, one or more polyolefinic thermoplastic resins, or mixtures thereof. In at least one other specific embodiment, at least one tie layer can include a styrenic copolymer, a polar-modified polyolefin or an ethylene-ester copolymer. Preferably, there are one or more tie layers sandwiched between any core layer and any skin layer. The "styrenic copolymer" for use in the tie layer is as generally described above. Commercial embodiments of a desirable styrenic copolymer are K-Resin™ DK11, or other film grade K-Resins (Chevron Phillips) or a styrene-ethylene/butylene-styrene block copolymer ("SEBS") such as Kraton™ G series (Kraton Polymers USA), or an Asahi Tuftec™ styrenic copolymer.

In one or more embodiments, the tie layer can include a copolymer (or blend thereof) of ethylene with an ester ("ethylene-ester") such as an ethylene/vinyl acetate copolymer, or an ethylene/methyl acrylate copolymer, an ethylene/n-butyl acrylate copolymer, or an ethylene/ethyl acrylate copolymer, for example. Ionomers (partially hydrolyzed ester derivatives) are also suitable as tie layer material, and can be used alone or in a blend with other tie layer materials. Alternatively, the tie layer can include a grafted polyolefin, and in particular a polyolefin having been grafted with a polar moiety-containing group ("polar-modified polyolefin"), such as a polyethylene or polypropylene backbone grafted with at least one ethylenically unsaturated carboxylic acid, carboxylic acid anhydride, or other derivative, as known in the art. Suitable carboxylic acids and carboxylic acid anhydrides include, but are not limited to, acrylic acid, methacrylic acid, and maleic acid or maleic anhydride (the latter generally used as grafting monomers). Suitable terpolymers may have the ethylene, ester, and acid or anhydride incorporated into a main chain of the polymer, or can include an ethylene/ester copolymer grafted with the acid or anhydride.

As used herein, "ethylene-ester copolymer" refers to a class of compounds that is formed by the polymerization of ethylene and vinyl-acrylates or vinyl acetates (collectively, "ester" groups). More particularly, ethylene-ester copolymers comprise ester-derived groups selected from structures $CH_2CR^1(R^2)$, wherein $R^1$ is selected from hydrogen and $C_1$ to $C_{10}$ alkyls; and $R^2$ is selected from —$OOCR^3$ groups and —$COOR^3$ groups; and wherein $R^3$ is selected from hydrogen and $C_1$ to $C_{10}$ alkyls. The ethylene-ester copolymers described herein comprise within the range of from 2 or 4 or 10 or 12 to an upper limit of 26 or 30 or 40 wt % ester-derived units, based on the weight of the ethylene-ester copolymers.

Ethylene vinyl-acetate copolymer is a common vinyl acetate copolymer. Ethylene vinyl acetate copolymers ("EVA") are polymers of ethylene-derived units with acetate-derived groups randomly distributed throughout the chains. As the level of vinyl-acetate derived units in the copolymer increases, the level of crystallinity found relative to the ethylene-derived units alone decreases from 60% to 10%. This yields products ranging from materials similar to low density polythene to flexible rubbers. Common grades can contain from 2% to 50% vinyl acetate. Clarity, flexibility, toughness and solvent solubility increase with increasing vinyl-acetate derived units in the EVA.

Some examples of useful "acetate" groups incorporated into the ethylene-ester copolymers include acetate ($CH_3COO$—), propylate ($CH_3CH_2COO$—), butyrate, benzoate ($C_6H_5COO$—), monofluoracetate, cyclohexyl carboxylate, carbomethoxy (—$COOCH_3$), carboethoxy (—$COOC_2H_5$), carbopropoxy, etc. Typical moieties CH$_2$CH— may thus include, for example, vinyl acetate, vinyl propylate, vinyl benzoate, methyl acrylate, ethyl acrylate, methyl methacrylate (in which one of the hydrogens of the formula is replaced by the methyl group), ethyl acrylate, etc.

Ethylene methyl-acrylate copolymer is a common vinyl-acrylate copolymer. These copolymers are formed by the polymerization of ethylene and alkyl-acrylates such as methyl acrylate {CH$_2$CH(COOCH$_3$)} or ethyl acrylate {CH$_2$CH(COOCH$_2$CH$_3$)}, propyl acrylate, butyl acrylate, etc. Ethylene acrylic acid copolymer is another example of a common vinyl-acrylate copolymer.

The ethylene-ester copolymers that are useful in the tie layers described herein have a melt index (I$_2$, 190° C., 2.16 kg, ASTM 1238) within the range of from 0.05 or 0.08 or 0.1 or 0.15 to an upper limit of 2 or 5 or 8 or 10 dg/min in one embodiment. In one or more embodiments, the ethylene-ester copolymers that are useful in the tie layers described herein have a density (ASTM D-1505) within the range of from 0.910 or 0.915 or 0.920 or 0.930 to an upper limit of 0.945 or 0.950 or 0.955 or 0.960 g/cm$^3$. Thus, an exemplary density is within the range of from 0.930 to 0.950 g/cm$^3$.

The ethylene-ester copolymers that are useful in the tie layers described herein have a 1% Secant Modulus MD (ASTM D 882, 100 μm film) within the range of from 10 or 20 or 30 to an upper limit of 70 or 80 or 100 MPa in one embodiment; and has a 1% Secant Modulus TD within the range of from 10 or 20 or 30 to an upper limit of 70 or 80 or 100 MPa in one embodiment. The ethylene-ester copolymers that are useful in the tie layers described herein also have an Elongation at Break (ASTM D882, 100 μm film) of greater than 200% in one embodiment, and greater than 300% in another embodiment, and greater than 400% in yet another embodiment, and within the range of from 100 to 1000% in one embodiment, and within the range of from 200 or 300 to an upper limit of 700 or 800% in yet another embodiment, in both TD and MD. Examples of commercially useful ethylene-ester copolymers include Escorene™ Ultra EVAs (ExxonMobil Chemical Co.).

The components that make up the tie layer can vary depending upon the application in which the films will be used, and also dependent upon the identity of the skin layer. Typically, a tie layer will be chosen that is compatible with both the propylene-based core layer and the skin layer. In one embodiment, when the skin layer comprises a styrenic copolymer, the tie layer consists of a styrenic copolymer; and in another embodiment, when the skin layer comprises a polyester copolymer, the tie layer consists of an ethylene-ester copolymer or a polar-modified polyolefin, or a blend of the two.

Commercial examples of other suitable tie layer materials include maleic anhydride modified ethylene-vinyl acetate, such as Bynel™ E418 adhesive resin (DuPont), and an Escor™ ATX 325 acid terpolymer (ExxonMobil Chemical), which is an ethylene-based resin having both ester and acrylic acid functionality, and Admer™ AT1955A modified polyolefin (Mitsui), or Bynel™ resins (DuPont) or SE810 resins (Mitsui).

In one or more embodiments, the average thickness of the tie layer is within the range of from 0.5 or 1 to an upper limit of 4 or 5 or 6 μm. Thus, an exemplary tie layer average thickness is within the range of from 1 to 6 μm.

Additives

In one or more embodiments, one or more additives can be present in any one or more layers of the multi-layer film. Suitable additives can include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives can be used in effective amounts, which vary depending upon the property required.

Examples of suitable opacifying agents, pigments or colorants are iron oxide, carbon black, aluminum, titanium dioxide (TiO$_2$), calcium carbonate (CaCO$_3$), polybutylene terephthalate (PBT), talc, beta nucleating agents, and combinations thereof.

Cavitating or void-initiating additives can include any suitable organic or inorganic material that can be incompatible with the polymer material(s) of the layer(s) to which it can be added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. Cavitation can also be introduced by beta-cavitation, which includes creating beta-form crystals of polypropylene and converting at least some of the beta-crystals to alpha-form polypropylene crystals and creating a small void remaining after the conversion. Preferred beta-cavitated embodiments of the core layer can include a beta-crystalline nucleating agent. Substantially any beta-crystalline nucleating agent ("beta nucleating agent" or "beta nucleator") can be used. The average diameter of the void-initiating particles typically can be from about 0.1 to 10 microns.

Slip agents can include higher aliphatic acid amides, higher aliphatic acid esters, waxes, silicone oils, and metal soaps. Such slip agents can be used in amounts ranging from 0.1 to 2 wt % based on the total weight of the layer to which it can be added. An example of a slip additive that can be useful for this invention can be erucamide.

Non-migratory slip agents, used in one or more skin layers of the multi-layer films described, can include polymethyl methacrylate (PMMA). The non-migratory slip agent can have a mean particle size in the range of from about 0.5 to 8 microns, or 1 to 5 microns, or 2 to 4 microns, depending upon layer thickness and desired slip properties. Alternatively, the size of the particles in the non-migratory slip agent, such as PMMA, can be greater than 20% of the thickness of the skin layer containing the slip agent, or greater than 40% of the thickness of the skin layer, or greater than 50% of the thickness of the skin layer. The size of the particles of such non-migratory slip agent can also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes can be also contemplated.

Suitable anti-oxidants can include phenolic anti-oxidants, such as IRGANOX® 1010 (commercially available from Ciba-Geigy Company of Switzerland). Such an anti-oxidant can be generally used in amounts ranging from 0.1 to 2 wt %, based on the total weight of the layer(s) to which it can be added.

Anti-static agents can include alkali metal sulfonates, polyether-modified polydiorganosiloxanes, polyalkylphenylsiloxanes, and tertiary amines. Such anti-static agents can be used in amounts ranging from about 0.05 to 3 wt %, based upon the total weight of the layer(s).

Examples of suitable anti-blocking agents can include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL (commercially available from GE Bayer Silicones of Wilton, Conn.). Such an anti-blocking agent can include an effective amount up to about 3000 ppm of the weight of the layer(s) to which it can be added.

Fillers useful in this invention can include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives can include effective amounts of low-molecular weight resins, hydrocarbon resins, particularly petroleum resins, styrene resins, cyclopentadiene resins, and terpene resins.

Optionally, one or more skin layers can be compounded with a wax or coated with a wax-containing coating, for lubricity, in amounts ranging from 2 to 15 wt % based on the total weight of the skin layer. Any conventional wax, such as, but not limited to Carnauba™ wax (commercially available from Michelman Corporation of Cincinnati, Ohio) that can be useful in thermoplastic films can be contemplated.

Process to Manufacture

The films described can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the "tentered" method. In the tentered process, line speeds of greater than 100 m/min to 400 m/min or more, and outputs of greater than 2000 kg/hr to 4000 kg/hr or more are achievable. In the tenter process, sheets/films of the various materials are melt blended and coextruded, such as through a 3, 4, 5, 7-layer die head, into the desired film structure. Extruders ranging in diameters from 70 or 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation ("MDO"). It is understood by those skilled in the art that this temperature range can vary depending upon the equipment, and in particular, upon the identity and composition of the components making up the film. Ideally, the temperature will be below that which will melt the film, or cause it to become tacky and adhere to the equipment, but high enough to facilitate the machine direction orientation process. Such temperatures referred to herein refer to the film temperature itself. The film temperature can be measured by using, for example, InfraRed spectroscopy, the source aimed at the film as it is being processed; those skilled in the art will understand that for transparent films, measuring the actual film temperature will not be as precise. In this case, those skilled in the art can estimate the temperature of the film by knowing the temperature of the air or roller immediately adjacent to the film measured by any suitable means. The heating means for the film line may be set at any appropriate level of heating, depending upon the instrument, to achieve the stated film temperatures.

The lengthened and thinned film is cooled and passed to the tenter section of the line for transverse direction orientation ("TDO"). The TD tenter section has at least three zones that can be temperature controlled, and the temperatures stated herein for TDO are the zone temperatures. First, the edges of the sheet are grasped by mechanical clips on continuous chains and pulled into a long, precisely controlled hot air oven for a pre-heating step. The zone temperature ranges from 100 or 110 to 150 or 170 or 180° C. in the pre-heating step. Again, the temperature will be below that which will melt the film, or cause it to become tacky and adhere to the equipment, but high enough to facilitate the step of transverse direction orientation. Next, the edges of the sheet are grasped by mechanical clips on continuous chains and pulled into a long, precisely controlled hot air oven for transverse stretching, or "stretching zone". As the tenter chains diverge a desired amount to stretch the film in the transverse direction, the stretching zone temperature is lowered 2 or 5 to 15 or 20 or 30 to 40° C. below the pre-heating step zone temperature. After stretching to achieve transverse orientation in the film, the film is then cooled in an "anneal" or "cooling" zone from 5 to 10 or 15 or 20 or 30 or 40° C. below the stretching zone temperature, holding or slightly decreasing (by no more than 5%) the amount of stretch, followed by releasing the clips prior to edge trim, optional coronal, printing and/or other treatment can then take place, followed by winding.

Thus, TD orientation is achieved by the steps of pre-heating the film having been machine oriented, followed by stretching at a lower temperature, and then followed by a cooling step at a lower temperature. In one embodiment, the films described are formed by imparting a transverse orientation by a process of first pre-heating the film, followed by a decrease in the film temperature within the range of from 2 or 5° C. to 10 or 15 or 20 or 30 or 40° C. relative to the pre-heating temperature while performing transverse orientation of the film, followed by a further lowering of the film temperature within the range of from 5° C. to 10 or 15 or 20 or 30 or 40° C. relative to the stretching temperature. The latter step helps to impart the high TD shrink characteristics of the films described. Thus, for example, where the pre-heat zone temperature is 118° C., the stretch zone temperature may be 108° C., and the cooling zone may be 93° C., or any temperature within the ranges disclosed. The steps are carried out for a sufficient time to affect the desired film properties as those skilled in the art will understand.

In the films described, the films are drawn from 1.1 to 2 or 2.5-fold in the machine direction, and from 4 or 5 to 8 or 9 or 10-fold in the transverse direction. The oriented films can then be sealed using a hot melt adhesive or sealed using a solvent such as tetrahydrofuran, preferably solvent sealed, to form a tube or "sleeve" that can be heat-shrinked onto a bottle or other article to form a label on the bottle.

The thickness and identity of the skin and tie layers are chosen in one or more embodiments to maintain a desirable Tensile Strength of the films. In one or more embodiments, the films described have a TD Tensile Strength (ASTM 882)

of from 100 or 125 MPa to an upper limit of 350 or 400 MPa. In one or more embodiments, the films described have a MD Tensile Strength of from 20 or 25 MPa to an upper limit of 55 or 60 or 70 MPa. Thus, an exemplary range of MD tensile strength is within the range of from 20 to 60 MPa, and 125 to 400 MPa for TD tensile strength.

Applications

The films described can have utility in many applications. Certain applications are ideal such as, for example, labeling, covering, and/or packaging of materials such as bottles, tubes and other cylindrical articles, especially bottles, tubes and cylindrical articles having a contoured shape. Other uses of the films include covering boxes, plates and other vessels.

In certain applications of the films, it is desirable to affect shrinkage along a single axis without substantial shrinkage in the other axis, which the films described are capable of. For example, in the process of labeling bottles by shrinking a tube of heat shrinkable material, if the film shrinks too much along its length, the label may not be positioned correctly but rather placed above the desired position upon shrinkage. This problem is solved in the current films. Moreover, printing and other conversion processes of such label surfaces require heat stability in at least one direction, preferably both directions, to meet machinability requirements. Ideally, the films should not shrink during processing, handling and shipment; and preferably, the films shrink only when induced to shrink as by heating the film when it is applied to a surface to be used as a label, etc.

Of further utility of the films is their overall lower density than the density of the materials to which they are associated with (bottle, container, etc.), thus facilitating recovery of the label (film) from the article to which it is attached. This is accomplished in part by the use of polyolefin-based core layers, and further, the predominance of the polyolefin over other higher density materials. Thus, in one or more embodiments of the invention, the core layer(s) of the films comprise at least 70 wt % of the total weight of the multilayered film, and comprises at least 80 wt % in another embodiment.

EXAMPLES

The foregoing discussion can be further described with reference to the following non-limiting examples. Coextruded BOPP films having a 0.80 mil poly gauge three layer (A/B/A) structure were made using conventional biaxial orientation techniques. In particular, a basesheet was quenched in a water bath, then subsequently reheated on both sides by contact with hot moving rolls at about 190° F. Once reheated, the basesheet was stretched in the machine direction about 5 times in the machine direction. The MD stretched basesheet was further quenched, then reheated in the TDO, then stretched in the transverse direction in a tenter frame oven at about 9 times, at temperatures about 330° F. The 0.8 mil was corona treated on one side, then it was wound up in a mill roll form.

The formulations and certain physical properties of the core layers are shown in Table 1.

TABLE 1

| | B Layer | | | | | | | | |
|---|---|---|---|---|---|---|---|---|---|
| Example | PP1 | PR100A | PCP-01 | PCP-02 | PCP-03 | Avg. Heat Shrinkage (%) | Haze (%) | Gloss (%) | Secant Modulus kpsi |
| 1 | 100 | | | | | 5 | 0.5 | 95.2 | |
| 2 | 93.75 | 6.25 | | | | 6.3 | 0.33 | 92 | 351 |
| 3 | 87.5 | 12.5 | | | | 8 | 0.19 | 96.8 | 407 |
| 4 | 81.25 | 6.25 | 12.5 | | | 10.8 | 0.96 | 91 | 244 |
| 5 | 75 | 12.5 | 12.5 | | | 10.5 | 1.05 | 91.1 | 244 |
| 6 | 81.25 | 6.25 | | 12.5 | | 12.5 | 0.24 | 95.8 | 251 |
| 7 | 75 | 12.5 | | 12.5 | | 13.5 | 0.17 | 96.8 | 327 |
| 8 | 81.25 | 6.25 | | | 12.5 | 17.1 | 0.18 | 95.1 | 283 |
| 9 | 75 | 12.5 | | | 12.5 | 17.5 | 0.22 | 93.7 | 341 |

PR100A is a hydrogenated cycloaliphatic resin having a softening point of about 140° C.

EMCC PP1 is Isotactic Polypropylene having the following properties:

| | |
|---|---|
| MFR | 2.7 |
| Decalin solubles | 3.0 |
| Ethylene wt % | 0.55 |
| Tm | 160° C. |
| Heat of Fusion | 102.3 J/g |
| Crystallization Temp | 109.1° C. |
| Mw | 358,959 |
| MWD | 4.6 |

PCP-01, -02, -03 are a metallocene catalyzed propylene/ethylene copolymer. VSP is vicat softening point as measured by ASTM D1525.

| | MFR | % C2 | Tg (C.) | VSP (C.)* | Tm(C.) | Density |
|---|---|---|---|---|---|---|
| PCP01 | 3 | 16 | −30 | 45 | 50 | 0.86 |
| PCP02 | 3 | 11 | −25 | 65 | 68 | 0.87 |
| PCP03 | 8 | 9 | | 80 | | 0.88 |

The films had the following properties:

| | |
|---|---|
| Film Sample | 18μ BOPP film |
| Film Structure | ABA |
| A layer | Fina 8573HB ethylene propylene random copolymer, 0.6 to 1μ |
| A layer | Can also be homo polypropylene as well |
| B layer | Resin in attached table I |
| MDX | 5 |
| TDX | 8 to 9 |
| Heat shrinkage | Measured at 120 C. |

As shown in Tables 1, Examples 4-9 that contained a propylene-based polymer had over 10% of shrinkage while maintaining a good balance of other properties.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A heat-shrinkable film comprising:
   at least one layer comprising:
   (i) at least one propylene-based polymer comprising 60 wt % to 98 wt % propylene derived units and 2 wt % to 40 wt % one or more other alpha olefins, the propylene-based polymer having:
   a triad tacticity of 70% or more,
   a heat of fusion of less than 80 J/g,
   a weight average molecular weight (Mw) as measured by GPC of from 70,000 to 250,000, and
   (ii) at least one polyolefinic thermoplastic resin, wherein the at least one polyolefinic thermoplastic resin comprises a polypropylene-based polymer having:
   a heat of fusion of more than 80 J/g,
   a melt flow rate of less than 20 g/10 min; and
   a weight average molecular weight (Mw) as measured by GPC of from 90,000 to 500,000 g/mol; and
   (iii) at least one hydrocarbon resin;
   wherein the propylene-based polymer is present in an amount from 70 to 90 wt %, the polyolefinic thermoplastic resin is present in an amount from 5 to 20 wt %, and the hydrocarbon resin is present in an amount of from 1 to 20 wt % based on the total weight of the film.

2. The heat-shrinkable film of claim 1 wherein the propylene-based polymer has a heat of fusion of less than 45 J/g.

3. The heat-shrinkable film of claim 1, wherein the propylene-based polymer has a MFR of at least 3.0 g/10 min.

4. The heat-shrinkable film of claim 1, wherein the at least one hydrocarbon resin has a number-average molecular weight (Mn) of from 200 to 5,000.

5. The heat-shrinkable film of claim 1, wherein the at least one hydrocarbon resin has a glass transition temperature of greater than 20° C.

6. The heat-shrinkable film of claim 1, wherein the at least one hydrocarbon resin is a hydrogenated cycloaliphatic resin.

7. The heat-shrinkable film of claim 1, wherein the at least one hydrocarbon resin comprises from 60% to 90% piperylene, from 5% to 15% cyclic components, and from 5% to 20% styrenic components, and the at least one hydrocarbon resin has a ring and ball softening point of about 50° C. to about 160° C.

8. The heat-shrinkable film of claim 1, wherein the at least one propylene-based polymer has a MWD of 1.8 to 9.0.

9. The heat-shrinkable film of claim 1, wherein the at least one propylene-based polymer has a MWD of 1.8 to 3.0.

10. The heat-shrinkable film of claim 1, wherein the at least one hydrocarbon resin has a number average molecular weight (Mn) of from 500 to 1000.

11. The heat-shrinkable film of claim 1, wherein the at least one hydrocarbon resin has a softening point of from 85° C. to 140° C.

12. The heat-shrinkable film of claim 1, wherein the at least one hydrocarbon resin has a softening point of from 100° C. to 140° C.

13. The heat-shrinkable film of claim 1, wherein the film has an average heat shrinkage index of greater than 10%.

14. A method of making a heat-shrinkable film comprising:
   a. Admixing (i) at least one propylene-based polymer comprising 60 wt % to 98 wt % propylene derived units and 2 wt % to 40 wt % one or more other alpha olefins, the propylene-based polymer having: a triad tacticity of 70% or more, a heat of fusion of less than 80 J/g, and a weight average molecular weight (Mw) as measured by GPC of from 70,000 to 250,000, (ii) at least one polyolefinic thermoplastic resin, wherein the at least one polyolefinic thermoplastic resin comprises a polypropylene-based polymer having: a heat of fusion of more than 80 J/g, a melt flow rate of less than 20 g/10 min; and a weight average molecular weight (Mw) as measured by GPC of from 90,000 to 500,000 g/mol, and (iii) at least one hydrocarbon resin in an amount sufficient to form a blend which provides at least one layer for a film having an average heat shrinkage index of greater than 10%.

15. The method of claim 14, wherein the at least one hydrocarbon resin is a hydrogenated cycloaliphatic resin having a softening point of 85° C. to 140° C. and a number-average molecular weight of from 200 to 5,000.

16. The method of claim 14, wherein the propylene-based polymer is present in an amount of from 70 to 90 wt % and the hydrocarbon resin is present in an amount of from 5 to 20 wt % based on the total weight of the film.

* * * * *